March 16, 1971    J. T. DEL VECCHIO    3,570,129
ENGRAVING MACHINE

Filed March 6, 1968    3 Sheets-Sheet 1

INVENTOR.
JOSEPH T. Del VECCHIO

BY

Howard C. Meskin
ATTORNEY

March 16, 1971  J. T. DEL VECCHIO  3,570,129
ENGRAVING MACHINE
Filed March 6, 1968  3 Sheets-Sheet 2
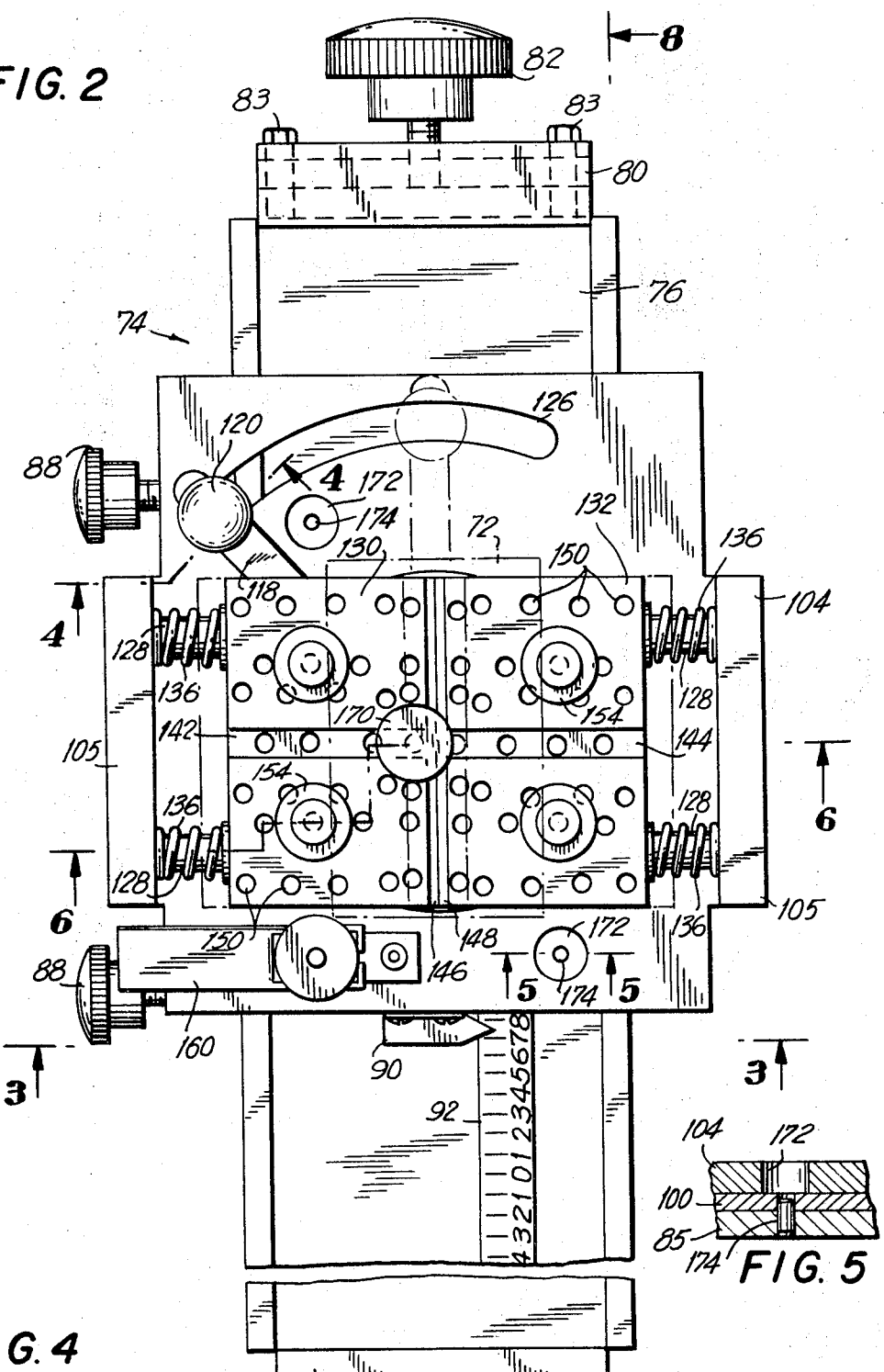
FIG. 2
FIG. 4
FIG. 5
INVENTOR.
JOSEPH T. Del VECCHIO
BY
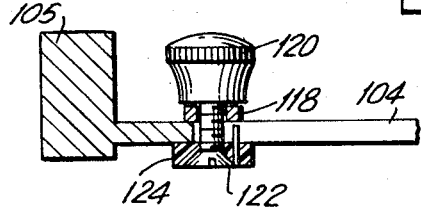
ATTORNEY

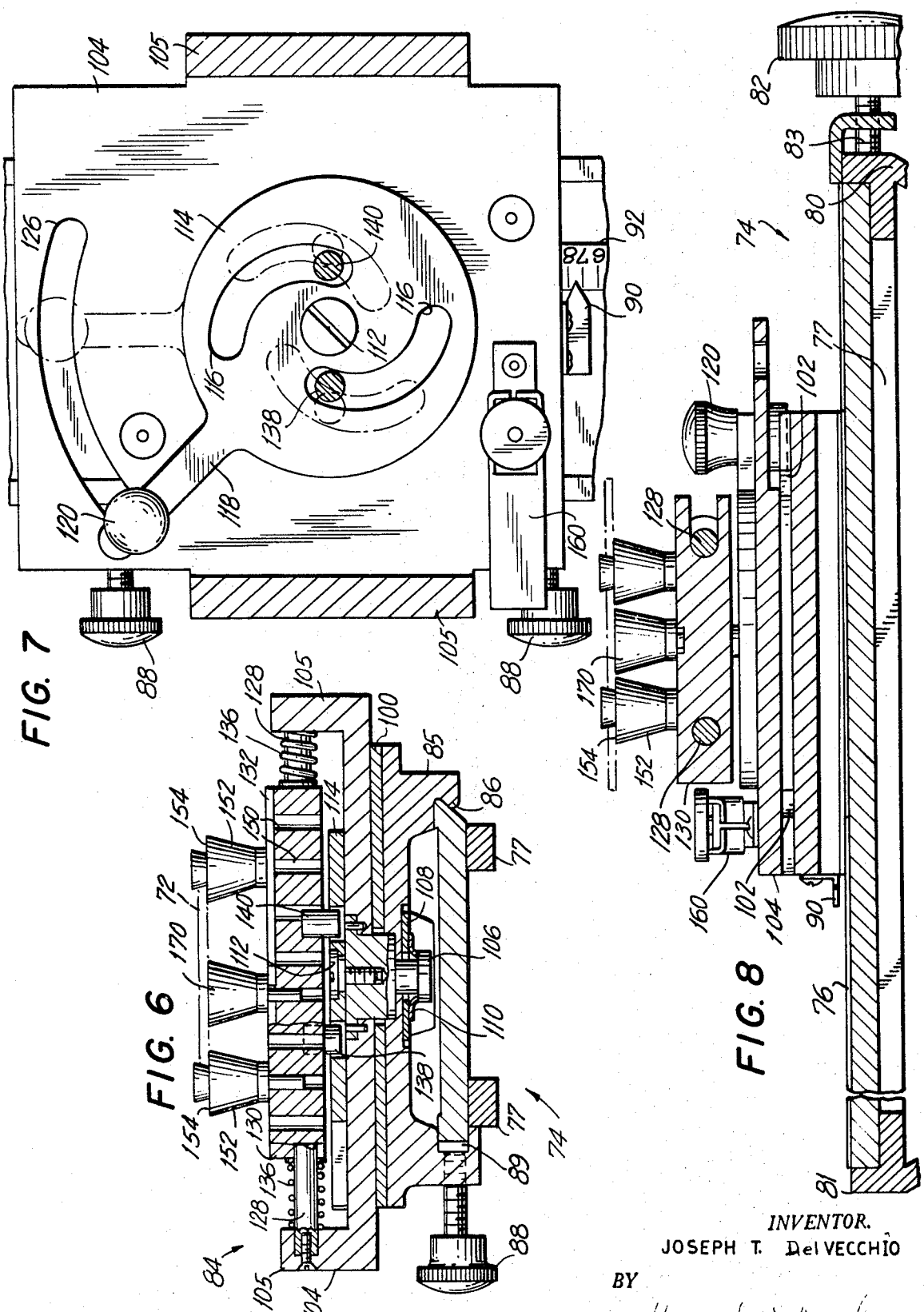

United States Patent Office 3,570,129
Patented Mar. 16, 1971

3,570,129
ENGRAVING MACHINE
Joseph T. Del Vecchio, Manuet, N.Y., assignor to Granlip Corporation, New York, N.Y.
Filed Mar. 6, 1968, Ser. No. 710,838
Int. Cl. B43l 13/10
U.S. Cl. 33—25
10 Claims

ABSTRACT OF THE DISCLOSURE

An engraving machine with an engraving tool having a first member reciprocally movable in a plane transverse to the axis of the engraving tool and a second member mounted on said first member and reciprocally movable in that plane at right angles to the movement of the first member. The second member includes jaws on which are mounted the articles to be engraved, which jaws are normally biased closed and are opened and closed simultaneously by cam action.

---

This invention relates to a machine for engraving letters, insignia or other markings on articles of jewelry or other objects, and in particular, letters or characters reproduced from a pattern by means of a pantograph or the like linkage on objects releasably held in fixed relative position to the engraving tool.

Presently there are various types of engraving machines on the market for engraving trophies, plaques, finger rings and similar items. Most of these engraving machines utilize a stylus that is placed in and moved to follow individual guide letters or stencils. An engraving or working tool is positioned to simultaneously engage the article to be engraved and form or cut the individual letters or marking on the article, responsive to movement of the stylus. In order to engrave properly, the article to be engraved must be firmly held, so as not to move during the engraving process. Since these engraving machines are intended to engrave various types of articles of different sizes, shapes and forms, the manner of holding the article is an important part of an all purpose engraving machine. Heretofore, for these articles to be firmly held required an undue compressive force on the article or object, oftentimes marring or deforming it. Further, the article holders of these engraving machines required many hand movements of the operator to properly position the article with respect to the work tool. Opposite threaded shafts were used to move the jaws and apply a compressive force. The present invention allows various types of objects or articles to be firmly held during the engraving operation without requiring undue compressive force on a delicate article and which allows the object to be quickly positioned relative to the engraving tool.

Accordingly, it is an object of the present invention to provide an engraving machine having an article holding mechanism which will hold articles of various sizes and shapes and forms, conveniently and securely during the engraving process, without exerting undue compressive force on these articles, even hollow objects.

Another object of the present invention is to provide an engraving apparatus having an article holding apparatus for quickly and securely holding and centering the articles to be engraved, and which holding apparatus can be rotated in predetermined increments, and which apparatus can be quickly and easily adjustable by the engraver.

A further object of the present invention is to provide an engraving block for use within an engraving machine, which releasably holds articles of varying sizes, shapes and forms in engraving position with respect to the engraving tool, which is so simple and efficient in operation and construction that it may be operated by a person who is substantially unskilled and untaught in the art of engraving, and which is positive in operation and durable in use.

Still another object of the present invention is to provide an engraving block for engraving machines which can be incorporated into existing engraving machines, and which can quickly hold and center articles to be engraved, which articles vary in size, shape and form, and which quickly releases the engraved article by a simple movement of the operator.

Yet another object of the present invention is to provide for an engraving machine, an assembly for holding the article to be engraved, which is easily centered with respect to the engraving tool, and which is versatile in its application so that small as well as bulky articles may be held within the work holder positively and symmetrically, and which is easy to use so that inexperienced operators may secure a satisfactory engraving job quickly and economically, and allow change-over from one type of an article to another, quickly and efficiently.

Other and further objects and features of the present invention will become apparent to those skilled in the art from a consideration of the attached drawings, in which one embodiment of the invention is illustrated by way of example only and wherein:

FIG. 2 is a top plan view of the work holder assembly;

FIG. 4 is a cross-sectional view taken along line 4—4 of FIG. 2;

FIG. 5 is a cross-sectional view taken along line 5—5 of FIG. 2;

FIG. 6 is a cross-sectional view taken along line 6—6 of FIG. 2;

FIG. 7 is a cross-sectional view taken along line 7—7 of FIG. 3; and

FIG. 8 is a cross-sectional view taken along line 8—8 of FIG. 2.

Figure 1:
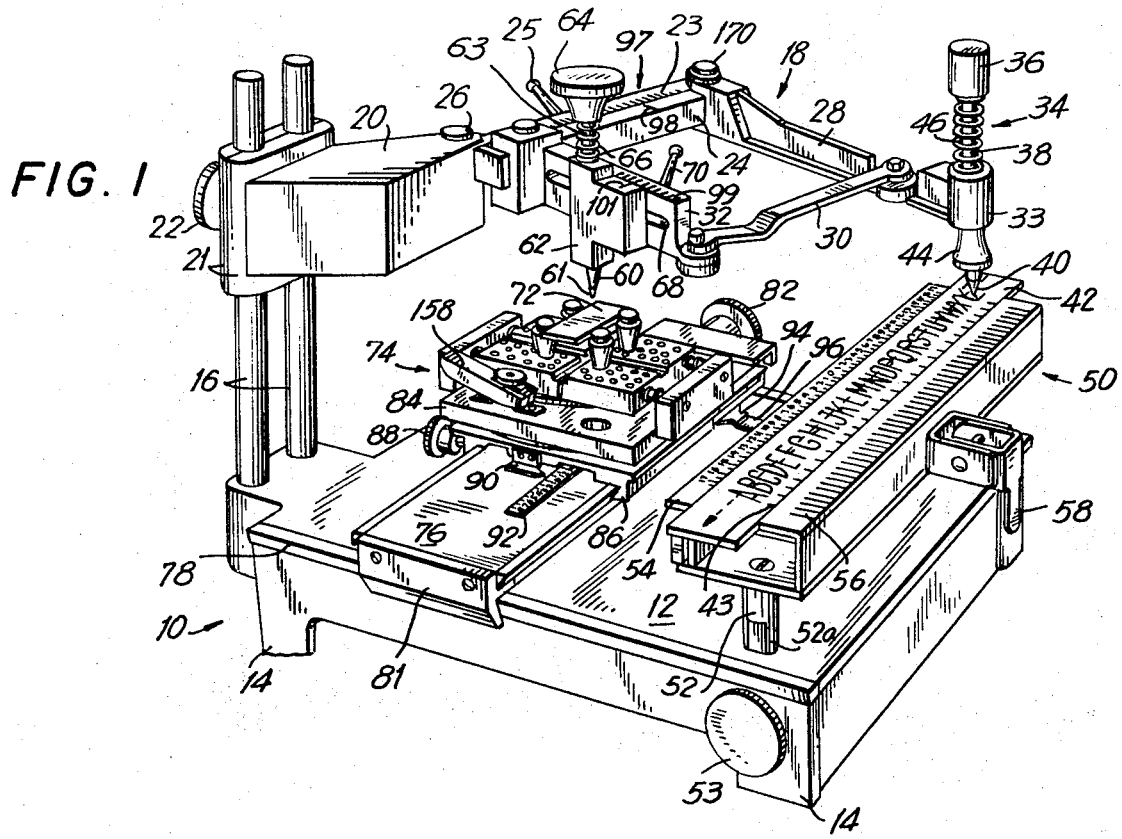
FIG. 1 is a perspective view of an engraving machine having a work holder made in accordance with the present invention.

Referring to the drawings, numeral 10 designates a body member preferably made of metal which could be of die cast construction. Body 10 has a flat base surface 12 having support members 14. Each of support members 14 could have on its respective bottom surface a cushion member (not shown) so that the device may be placed on a table or other finished surface without marring or defacing it.

Extending upwardly from the rear of body member 10 are a pair of upright support posts 16. Posts 16 adjustably support a pantograph-type engraving unit illustrated generally at 18. Engraving unit 18 is movable vertically with respect to base surface 12 by means of a support assembly 20 slidably mounted on vertical posts 16. Engraving unit 18 is positioned relative to base surface 12 by tightening knob 22 which clamps members 21 together about posts 16 for frictionally holding support assembly 20 with respect to posts 16. Support assembly 20 is attached to one of clamp members 21.

Pivotally mounted to support assembly 20 about pin 26 is a support arm 23. Pantograph 18 is a conventional unit having four legs 24, 28, 30, 32, and is adjustably supported by arm 23. Leg 24 is axially movable along arm 23 and is selectably clamped in position thereto by tightening locking handle 25 for frictionally holding leg 24 with respect to arm 23. Legs 24, 28, 30 and 32 are pivoted to their adjoining legs and legs 28 and 32 are pivoted to leg 24, which forms the fourth side of a parallelogram. Mounted at the end of an outwardly extending part of leg 28 is a cylindrical housing 33 which has a longitudinally extending opening therein. Slidably mounted in the opening within housing 33 is a tracing stylus 34. Tracing stylus 34 has a grip knob or head 36 mounted at the upper end of a tubular plunger or rod 38, which is slidably mounted within the opening of housing 33. The lower end of plunger 38 has a guide point 40, which is adapted to fit into stylus guide letters and stencils, illustrated generally in a type bar 42. Mounted on the lower end of plunger 38 adjacent guide point 40 is a radially outwardly extending flange 44 having an outer diameter larger than the diameter of the opening within housing 33. Mounted about the outer peripheral surface of plunger 38 and interposed between knob 36 and the upper end surface of housing 33 is a compression spring 46. Spring 46 urges plunger 38 towards its elevated position and has the upper surface of flange 44 engaging the lower surface of housing 33. Advantageously, knob 36 has an interiorly directed concentric recess therein (not shown) which receives spring 46 when knob 36 is fully depressed.

Type bar 42 is slidably movable in guide letter assembly 50. As shown, guide letter assembly 50 is positioned on a pair of vertical support columns 52, slidably mounted on body member 10. Assembly 50 can be positioned vertically relative to base 12 by tightening knob 53 which frictionally engages a flattened portion 52a on column 52. Type bar 42 has cut therein a plurality of grooves forming a series of letters or markings, with each letter or marking advantageously being completely traced without removing tracing sylus or guide point 40 from the grooves. Further, type bar 42 is provided with a series of vertical lines 43, which are positioned beneath the center of each of the letters or markings thereon to aid in operating the device. Extending horizontally across guide letter assembly 50 adjacent the upper longitudinal edge of type bar 42 is a letter guide 54. Letter guide 54 has equal graduations on its upper surface extending from a central point marked O to a predetermined figure on opposite sides of O which figure is shown as 17. These graduations are spaced an equal distance apart and advantageously the spaces between the main graduations are sub-divided into halves. Longitudinally disposed and mounted on guide letter assembly 50 along the bottom edge of type bar 42 and generally coplanar with guide 54 is a writing strip 56 having a series of graduations or markings thereon, generally aligned with the graduations or markings on letter guide 54. Type bar 42 is slidably movable between letter guide 54 and writing strip 56, and is adapted to be quickly clamped into fixed position during the tracing operation, as will be discussed. Advantageously, letter guide 54 and writing strip 56 are movable towards and away from each other in any convenient manner for clamping type bar 42 fixedly into position. One manner of accomplishing this clamping operation is by means of a handle 58 attached to guide letter assembly 50 and coupled to letter guide 54, such as by a shaft or the like, not shown, to move letter guide 54 to and from writing strip 56 so as to clamp type bar 42 into fixed position, as desired.

Fixedly attached to leg 32 of pantograph 18 is an engraving tool 60, which advantageously has a diamond tip 61 and is adjustably attached to a cutter assembly 62, which assembly is movably mounted on leg 32 of pantograph 18 in a plane parallel to surface 12. Assembly 62 is horizontally movable by means of a slot 68 longitudinally disposed in leg 32, through which passes a shaft which engages cutter assembly 62. Cutter assembly 62 is fixed in a predetermined position relative to leg 32 by a clamping arm 70, which frictionally locks assembly 62 in fixed position with respect to leg 32. Engraving tool 60 has diamond tip 61 on the lower end of a shaft 63 slidably passing through cutter assembly 62 and has a hand knob 64 mounted on the upper end of shaft 63. Surrounding shaft 63 and disposed between knob 64 and the upper surface of assembly 62 is a coil spring 66 which urges tool 60 in an upward position. Exerting a downward force on knob 64 positions diamond tip 61 of engraving tool 60 in its lower, operative position.

Figure 3:
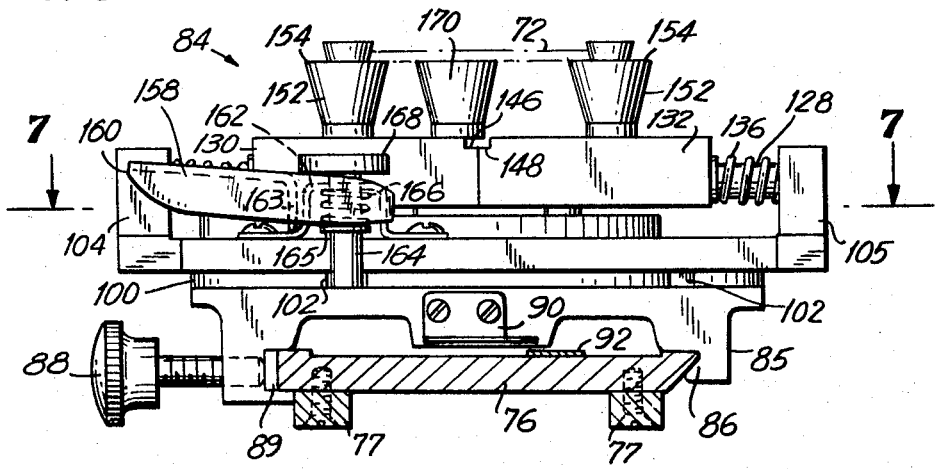
FIG. 3 is a cross-sectional view taken along line 3—3 of FIG. 2.

The article to be worked upon indicated at 72 is clamped in position on a vise assembly 74, which is movable on and in a plane parallel to base 12 towards and away from guide letter assembly 50 and transverse to the longitudinal axis of tool 60. Vise assembly 74, seen best in FIGS. 2 and 7, includes sliding member 76 movable on body 10 towards and away from guide letter assembly 50 on bearing edges 78 on opposite sides of base 12. Member 76 has cooperating dovetail bearing elements 80 and 81, which as seen in FIGS. 1 and 7, are mounted on opposite ends of member 76 and which cooperate with beveled edges 78. Bearing element 80 is adjustably mounted to member 76 by fasteners 83 which allows bearing 80 to move slightly with respect to member 76. Member 76 is fixedly positioned on body 10 with respect to engraving tool 60 by tightening threaded locking member 82, which forces bearing 80 to engage corresponding edge 78 of base 10 and locks member 76 in position with respect to surface 12. To insure accurate engraving, member 76 must maintain its dimensional stability during operation of the device. To prevent deflection of member 76 during use, bars 77 extend the length of member 76, as seen best in FIGS. 3 and 5, to provide rigidity. Bars 77 may be attached by bolts, as shown, or made integral with member 76.

Sliding member 76 supports a carriage 84 which is slidably movable on member 76 parallel to guide letter assembly 50. Carriage 84 has a base plate 85 with a beveled sliding edge 86, as seen best in FIGS. 3 and 5, which cooperatively mates with a longitudinal beveled edge along member 76. The opposite edge of base plate 85 is generally U-shaped which slidably receives a cooperating longitudinal edge of member 76 and is selectively clamped in fixed position with respect to member 76 by means of a threaded locking member 88. Tightening member 88 forces a strip 89 against a bearing surface on member 76, so that the beveled edge 86 bears against its cooperating beveled edge of adjustable member 76, and so is locked in position. Strip 89 applies the locking force from member 88 over a wide area, thereby avoids stress concentration on member 76. As seen best in FIG. 2, two screw lock elements 88 are used to fixedly position carriage 84 on member 76 to insure axial alignment. However, if desired, a single centrally disposed screw lock member 88 could be used.

Fixedly positioned on one side of base plate 85 is an index pointer 90 shown mounted by screws, so that when carriage 84 is moved, pointer 90 moves along the top of member 76. Pointer 90 cooperates with an index scale 92 positioned on the upper surface of member 76. Similarly, member 76 has a pointer 94 cooperating with a scale 96 on base 12. Positioned on support arm 23 is a scale 97 which cooperates with a pointer 98 on leg 24. Also, leg 32 has a scale 99 which cooperates with a pointer or marker 101 on cutter assembly 62. Scales 92, 96, 97 and 99 are cooperatively arranged so that engraving tip 61 is quickly centered with respect to vise assembly 74, whatever ratio of size of engraved lettering to size of type on type bar 42 is used, in a manner disclosed hereinafter.

Fixedly mounted on base plate 85 of carriage 84 is a swivel base plate 100 having a series of openings 102 spaced a predetermined arc distance apart about its periphery. While holes 102 can be spaced at any angular distance apart, 45° has been found to provide adequate flexibility. Holes 102 are positioned at a predetermined radius. Rotatably mounted on swivel base plate 100 about a shaft 106 is a work holder 104 having upstanding arms 105 at opposite ends. Shaft 106 extends rotatably through the center of base plate 85 and swivel base plate 100 and engages work holder 104, as seen best in FIG. 5. Shaft 106 is retained in fixed position with respect to plate 85, and swivel base plate 100 by means of thrust washer 108 and lock prong 110. Pivotally mounted on work holder 104 about a stud 112 is a cam plate 114. As seen best in FIG. 6, cam plate 114 has a pair of generally arcuate openings 116 facing each other and disposed offset with respect to stud 112. Advantageously, openings 116 are equal and opposite so as to obtain equal movement, as discussed below. Cam 114 has a handle 118 extending radially outwardly, and which has a locking knob 120 threadedly mounted on its outer end. As best seen in FIG. 4, a bolt 122 passes through handle 118 and is threadedly received into knob 120. Mounted adjacent the head of bolt 122 is a lock washer 124 advantageously made of nylon. Work holder 104 has a generally elongated opening 126 therein along an arc that knob 120 follows for movement of handle 118. Bolt 122 passes through opening 126 so that lock washer 124 abuts the under-surface of work holder 104. To lock handle 118 of cam 114 in any position along opening 126 requires merely tightening knob 120, which urges washer 124 into frictional engagement with holder 104. Rotation of cam 114 in turn displaces arcuate openings 116, such as illustrated in shadow lines in FIG. 6.

Fixedly positioned between opposite walls 105 of work holder 104 are a pair of spaced apart parallel pins or shafts 128. Slidably mounted on said pins 128 are a pair of jaws 130 and 132, respectively, which abut substantially equidistant from walls 105, as seen best in FIG. 2. Jaws 130 and 132 are urged into abutting relation by springs 136 positioned about pins 128 and interposed between said jaws and said corresponding wall 105, so as to normally urge jaws 130 and 132 together. As seen best in FIGS. 5 and 6, extending downwardly from the undersurface of jaw 130 is a roller 138 dimensioned to be slidably received within a corresponding arcuate opening 116 in cam plate 114. Similarly, extending downwardly from the undersurface of jaw 132 is a roller 140 dimensioned to fit in the other arcuate opening 116 of cam 114. Rollers 138 and 140 are rotatable and reduce friction when coacting with the surfaces of corresponding cam openings 116. Jaws 130 and 132 have a generally flat upper surface, each divided by a transverse groove 142 and 144, respectively, which grooves are advantageously aligned. Jaws 130 and 132 have lips 146 and 148, respectively, along their forward edges facing each other. Lips 146 and 148 form ledges or shoulders to securely hold articles to be engraved. Each of the upper surfaces of jaws 130 and 132 are provided with a plurality of holes 150, which extend downwardly for a substantial depth of their respective jaws. These holes could extend through the jaws. Removably received within holes 150 are a plurality of pins 152 for holding objects of irregular shape for engraving. Pins 152 are of a stepped frusto-conical configuration being tapered downwardly and inwardly towards the jaws. This configuration of these pins provide for versatility in firmly holding various irregular shaped articles to be engraved. The stepped frusto-conical configuration of pins 152 provide a shoulder 154 which can support and hold firmly the articles to be engraved, in a manner as described hereinafter. Illustratively, four such pins are shown.

Work holder 104 is rotatable about its axis and may be locked in a fixed position at predetermined angles. Work holder 104 is held in fixed position with respect to swivel base plate 100 by means of a vise lock 158. Vise lock 158 has an arm 160, which is pivoted about an inverted, generally hat-shaped bracket 162, attached to work holder 104 by screws 163 through the end flanges. Mounted to the underside of arm 160 is an L-shaped bracket 163 having one leg extending downwardly adjacent hat-shaped bracket 162 and abutting the base of work holder 104, so as to pivot thereabout when a downward force is exerted on arm 160. Extending transversely through the flattened base of bracket 162 is a pin 164, which is slidably positioned in an opening in holder 104 and extends through holder 104 to be received in selected openings 102 in swivel base plate 100. Pin 164 has an outwardly extending flange 165. Mounted about pin 164 between flange 165 and the undersurface of the base of bracket 162 is a spring 166 which urges pin 164 downwardly. Pin 164 extends upwardly through bracket 162 and is threaded. A knob 168 is threadedly mounted on pin 164 and can adjust the tension on spring 166. To rotate work holder 104, arm 160 of plunger assembly 158 is depressed and pivots about one leg of bracket 163, thereby lifting knob 168 and overcoming the tension of spring 166 and lifting pin 164 out of opening 102 in swivel plate 100. Simultaneously, work holder 104 is then rotated a selected angular distance and arm 160 released. Pin 164 is urged downwardly into contact with plate 100 by action of spring 166 until pin 164 is received into the selected opening 102. Positioning of pin 164 into an opening 102, locks work holder 104 into fixed position with respect to base surface 12 and in turn engraving tool 60.

In order to obtain correct alignment of engraving, it is essential that the opening of jaws 130 and 132 be parallel to type bar 42, so as to hold work piece 72 parallel to the type bar 42. The ordinary tolerances in making the various elements, 76, 85, 105, etc., often would combine to produce non-parallel reproduction. To prevent this, work holder 104 and swivel plate 100 are initially pivotally mounted on base plate 85. At least one hole 172 is provided in holder 104. Jaws 130 and 132 are positioned so at to be parallel to type bar 42 and a pin 174 is inserted through hole 172 and locks swivel plate 100 to base plate 85, as best seen in FIG. 5. Pin 174 can be positioned in openings drilled in swivel plate 100 and base plate 85, while so aligned. As shown in FIG. 2, two holes 172 in holder 104 are provided. Further, while a pin 174 is shown, screws, keys, and the like can be used.

The engraving machine disclosed herein is quickly and easily set up for operation. The height of pantograph assembly 18 is adjusted by tightening or loosening knob 22 which clamps plates 21 about rods 16. Pantograph assembly 18 is swung away from the base 10, and pins 152 are positioned in selected holes 150 of jaws 130 and 132, as seen best in FIGS. 1–3. The holes 150 selected depend on the size and shape of the article to be engraved. Oftentimes the most favorable holes for positioning the pins are obtained by trial and error. Jaws 130 and 132 are separated by pivoting arm 118 of cam 114 in a clockwise direction as viewed in FIGS. 2 and 6. The clockwise rotation of cam 114 in turn rotates openings 116, which urge rollers 138 and 140 of jaws 130 and 132, respectively, apart, as indicated in shadow in FIG. 6 and which forces jaws 130 and 132 to separate and compress springs 136. The article to be worked, 72, is shown positioned between the coacting pins 152 and resting on their corresponding shoulders 154, knob 120 on arm 118 is released causing springs 136 to move jaws 130 and 132 in a closing direction and urge the frusto-conical portions of pins 152 to securely engage and hold article 72. Since each of jaws 130 and 132 moves an equal distance, article 72 is automatically centered between arms 105 and on work holder 104. For maximum holding pressure knob 120 is urged in a counterclockwise direction for forcing the jaws together and threaded so as to clamp arm 118 in fixed position with respect to work holder 104 by forcing lock washer 124 into tight engagement with the under-surface of work holder 104, as seen best in FIG. 4. The article to be worked upon, 72, is preferably centered on jaws 130 and 132 and carriage 84 is moved longitudinally along slidable member 76 until pointer 90 is in line with a center line on scale 92. Once carriage 84 has been positioned properly on member 76, screw lock elements 88 are tightened so as to urge strip 89 against the edge of member 76, as seen best in FIG. 3, and thereby clamp carriage 84 against the beveled edge of member 76 to prevent any relative movement. The selected type bar 42 is positioned in guide letter assembly 50 and fixedly held in position by actuating handle 58. To obtain the desired ratio of reproduction, the height of the type on type bar 42 is divided by the height of the desired engraved letter. Pantograph 18 is quickly adjusted to obtain the desired ratio by loosening knobs 25 and 70, and aligning the desired ratio on scales 97 and 99 with markers or pointers 98 and 101, respectively. The relative arrangement between pivot point 26 and engraving tip 61 is such that pivot point 26, engraving tip 61 and stylus point 40 when centered along type bar 42 lie along a straight line. In order to center jaws 130 and 132 with engraving tip 61, member 76 is moved so that pointer 94 is aligned with the marking of scale 96 on surface 12 corresponding to the selected ratio of scales 97 and 99. Engraving tool 60 is swung back into position. The article to be worked 72 is centered beneath engraving tool 60. Member 76 is locked in position by tightening locking member 82 firmly, which clamps bearing 80 of the adjustable member 76 against beveled edge 78 of base 12, and holds adjustable member 76 securely in place. The letters to be engraved, such as a name, initials, etc., are written on writing strip 56, aligning each letter with every other line, starting at the far left. The lettering in strip 56 is centered and the corresponding letter on type bar 42 is then positioned opposite the first sketched letter on writing strip 56 and type bar 42 is locked in position. The stylus guide point 40 is then placed in the selected letter on bar 42 and traced, while simultaneously lowering engraving tool 60 into contact with article 72 by a downward force exerted on knob 64. The type bar 42 is then loosened and moved to position the corresponding letter opposite the next letter to be engraved and the process repeated. By placing guide point 40 in turn in each of the letters selected to be engraved and following the outline thereof with the stylus, the corresponding letters will be engraved on the surface of the article, precisely centered and in the selected height. In use the selected letters on type bar 42 are moved into position opposite the letters on writing strip 56 and then the type bar 42 clamped for each tracing operation.

To produce non-linear engraving, article 72 is rotated with respect to engraving tool 74 by depressing arm 160 which removes pin 164 from the opening 102 in swivel plate 100, in which it was positioned, and rotating work holder 104. By removing the pressure on arm 160, the pin is urged downwardly by spring 166 onto plate 100 and the work holder 104 is automatically locked in position when the next opening 102 in plate 100 becomes aligned with pin 164.

If the article to be worked 72 is thin, a pin 170 can be placed in the center beneath the work. Pin 170 as seen in FIG. 6 has a flat top without the stepped frusto-conical configuration. Further, if desired, articles may be held between jaws 130 and 132, or between the lips 146 in the same manner as described above.

To release article 72, it is only necessary to unthread knob 120 and pivot cam arm 118 in a clockwise direction, so that jaws 130 and 132 separate and pins 152 are moved away from gripping engagement with article 72, thereby permitting article 72 to be readily and easily removed. Arm 118 is released and the jaws 130 and 132 return to closed position by action of springs 136. While article 72 was shown having flat edges, pins 152 firmly hold rings and odd-shaped articles.

It will be seen from the foregoing description that the jaw assembly positively and uniformly centers the article to be worked within work holder 104, so as to be quickly and easily aligned with respect to engraving tool 60, even when the size the engraved lettering is changed. Further, the vise assembly is capable of accommodating various sizes and shapes of articles, and due to its simplicity can be readily and easily operated. The lettering on the article to be worked is exactly centered and of the selected height, and various types and sizes of letters for use in the stylus can be easily and quickly positioned in guide letter assembly 50 between letter guide 54 and writing strip 56.

It is obvious that different size letters or stencils can be utilized by replacing type bars 42 having the various styles and types of letters. The type bars 42 are easily clamped into position in guide letter assembly 50 and used as discussed above. If desired, individual letters can be positioned in guide assembly 50 in place of type bar 42.

While one form of cam has been illustratively shown, other shaped cams can be used. Similarly, while springs were shown to provide the biasing force on jaws 130 and 132, other resilient structures or materials may be used. Further, to provide centering for the object to be engraved, both jaws were moved equal distance apart and together, unequal jaw movement may be obtained, if desired, by varying the curvature of the cam surface.

While a preferred embodiment of this invention has been shown, it is understood that various changes in the size, shape and arrangement of parts may be resorted to without departing from the spirit of the invention and the scope of the appended claims.

What I claim is:

1. An engraving machine for reproducing indicia and having a pantograph linkage with a stylus for following said indicia, comprising means for reproducing said indicia, a work holder having a pair of jaws movable towards and away from each other, means associated with each of said jaws for continuously and yieldingly urging said jaws into clamping position, said work holder including a base, an upstanding support at an opposite pair of ends of the base, a pin extending across said base and between said supports, said jaws being slidably mounted on said pin, and means adapted to separate and hold open said jaws for receiving the article to be engraved, said means including a cam pivotally mounted on said base and below said jaws, said cam being operatively connected to said jaws to equally reciprocate said jaws for receiving and holding said article to be engraved.

2. An engraving machine as in claim 1 further including means for selectively locking said jaws in spaced apart positions.

3. An engraving machine according to claim 1, wherein said reproducing means includes an engraving tool, and further including means moving said work holder in a plane transverse to the longitudinal axis of said engraving tool and locking means holding said work holder in selected position with respect to said engraving tool.

4. An engraving machine according to claim 1, wherein said yielding jaw clamping means is disposed between each jaw and its respective support for continuously urging said jaws together and further including means for locking said cam in selected jaw open position.

5. An engraving machine according to claim 1, wherein said yielding jaw clamping means are springs mounted about said pin between each support and its corresponding jaw, said cam has an arm radially extending outwardly beyond said jaws and said base has an elongated opening along the arc of movement of said cam arm, and further including means for locking said arm at a selected position along said base opening.

6. An engraving machine according to claim 1, wherein said cam is coupled to said jaws to reciprocate said jaws an equal distance about their line of contact and further including indexing means for rotating said work holder about the center of said line of contact of said jaws a selected arc distance and means for locking said work holder in said position with respect to said reproducing means.

7. An engraving machine for reproducing indicia and having a pantograph linkage with a stylus for following said indicia, comprising means for reproducing said indicia, a work holder having a pair of jaws movable towards and away from each other, means associated with each of said jaws for continuously and yieldingly urging said jaws into clamping position, and means adapted to separate and hold open said jaws for receiving the article to be engraved including a cam coupled to each of said jaws, and means reciprocating said jaws in response to movement of said cam, each of said jaws having a plurality of openings transverse to the upper surface of said jaws, a plurality of stepped frusto-conical pins removably receivable in selected ones of said openings, said pins having a reduced diameter end portion extending concentrically outwardly away from said jaws, said end portions being tapered inwardly and towards said jaws, the intersection of said end portion with its corresponding pin forming a stepped angular shoulder for locking the article to be engraved in position.

8. An engraving machine for reproducing indicia and having a pantograph linkage with a stylus for following said indicia, comprising means for reproducing said indicia, a work holder having a pair of jaws movable towards and away from each other, means associated with each of said jaws for continuously and yieldingly urging said jaws into clamping position, and means adapted to separate and hold open said jaws for receiving the article to be engraved, said last mentioned means including a cam coupled to each of said jaws, and further including means reciprocating said jaws an equal distance about their line of contact in response to rotation of said cam, indexing means for rotating said work holder about the center of said line of contact of said jaws a selected arc distance, means for locking said work holder in said position with respect to said reproducing means, a carriage on which said work holder is rotatably supported, means rotatably connecting said work holder on said carriage, a pin transversely supported in said work holder and urged into contact with said carriage, said carriage containing a series of recesses for cooperatively receiving said pin along the circumference of movement of the pin during rotation of said work holder, means for disengaging said pin from its mating recess, so that said work holder may be rotated, said work holder and said carriage being locked in fixed position during engagement of said pin in one of said recesses.

9. An engraving machine for reproducing indicia and having a pantograph linkage with a stylus for following said indicia, comprising means for reproducing said indicia, a work holder having a pair of jaws movable towards and away from each other, means associated with each of said jaws for continuously and yieldingly urging said jaws into clamping position, and means adapted to separate and hold open said jaws for receiving the article to be engraved, said last mentioned means including a cam coupled to each of said jaws, said cam being rotatably mounted on said work holder below said jaws and having a pair of elongated curved openings on opposite sides of said mounting, an arm attached to said cam and extending outwardly beyond said jaws, said work holder having an elongated opening along the arc of movement of said cam arm, means locking said arm at selected positions along said work holder opening, and means reciprocating said jaws in response to rotation of said cam, including a follower coupled to each of said jaws and each slidably received within a corresponding cam opening, so that said followers move in response to rotation of said cam and thereby reciprocate said jaws.

10. An engraving machine according to claim 9, wherein said locking means includes a threaded post on said cam arm and extending through the work holder opening, and a handle threadedly received on said post and adapted to engage the work holder when tightened.

References Cited

UNITED STATES PATENTS

| | | | |
|---|---|---|---|
| 540,649 | 6/1895 | Eastwood | 279—114 |
| 2,724,896 | 11/1955 | Mich | 33—25(A) |
| 2,729,892 | 1/1956 | Gruettner | 33—25(A) |
| 2,749,617 | 6/1956 | Gruettner | 33—25(A) |
| 3,107,575 | 10/1963 | Paul | 269—254 |
| 3,295,211 | 1/1967 | Nisenson | 33—23(K) |
| 1,666,634 | 4/1928 | Thomson | 33—26 |
| 2,644,241 | 7/1953 | Frisk | 33—191 |

FOREIGN PATENTS

| | | | |
|---|---|---|---|
| 210,112 | 1/1924 | Great Britain | 33—191 |

HARRY N. HAROIAN, Primary Examiner